INVENTORS
EDMOND G. FRANKLIN
JOHN N. POLIVKA
BY Stuart R. Peterson
ATTORNEY

Aug. 12, 1958   J. N. POLIVKA ET AL   2,846,940
FLUID SYSTEM FOR TOASTERS AND THE LIKE
Filed July 1, 1954   4 Sheets-Sheet 4

INVENTORS
EDMOND G. FRANKLIN
JOHN N. POLIVKA

BY Stuart R. Peterson
ATTORNEY

United States Patent Office 2,846,940
Patented Aug. 12, 1958

2,846,940

FLUID SYSTEM FOR TOASTERS AND THE LIKE

John N. Polivka and Edmond G. Franklin, Minneapolis, Minn., assignors to General Mills, Inc., a corporation of Delaware Application July 1, 1954, Serial No. 440,672

12 Claims. (Cl. 99—329)

This invention relates in general to a fluid system for moving a mechanical device with respect to a supply of heat, and pertains more particularly to a system of this character comprising a thermostat in heat transfer relation with the fluid medium.

In some situations, such as in an electric toaster, it is desirable that the contrivance be capable of successive use without widely differing end results. For instance, in a toaster the user frequently wishes to toast one slice of bread right after another, but due to the residual heat from the preceding toasting operation, the thermostatic control is influenced in such a manner that the degree of toasting will not be duplicated for the same thermostat setting. The foregoing problem has long been recognized and numerous attempts have been made to compensate for this happening. While some of the prior art arrangements have worked with various degrees of proficiency, nonetheless many are quite elaborate, costly and apt to get out of order easily. Accordingly, there is still a demand for a simple and rugged system that will produce a substantially uniform product, and it is an aim of the invention to provide a fluid system that will possess these attributes.

More specifically, a feature of the invention resides in the employment of a fluid system, together with a thermostat in heat transfer relation with a portion of the system, so that the fluid flowing through the system will affect the temperature of the thermostat at appropriate intervals. Referring again to an electric toaster where the invention will find especial utility, it is within the contemplation of the invention to utilize a pair of bellows located in a compartment that is somewhat cooler than that where the toasting action takes place. One of these bellows is mounted so as to actuate the toast rack, receiving fluid under pressure from the other which may be compressed to produce the fluid flow. By having a portion of the conduit or tube pass closely adjacent or contiguous to the thermostat, the fluid flowing in either direction will absorb heat from the thermostat when the thermostat is at an elevated temperature, thus producing a cooling action that is instrumental in conditioning the thermostat for the next toasting operation.

A further object of the invention is to provide a system of the foregoing character that lends itself readily to effortless operation, it being within the purview of the invention to utilize electrically energized power means for compressing one bellows to force fluid under pressure to the second bellows. Such power means, suggestively in the form of a solenoid, may be energized by merely actuating a push button type of switch, or if desired may be energized by a switch closable by the placing of a slice of bread upon the toast rack.

Other objects will be in part obvious, and in part pointed out more in detail hereinafter.

The invention accordingly consists in the features of construction, combination of elements and arrangement of parts which will be exemplified in the construction hereafter set forth and the scope of the application of which will be indicated in the appended claims.

Figure 1:
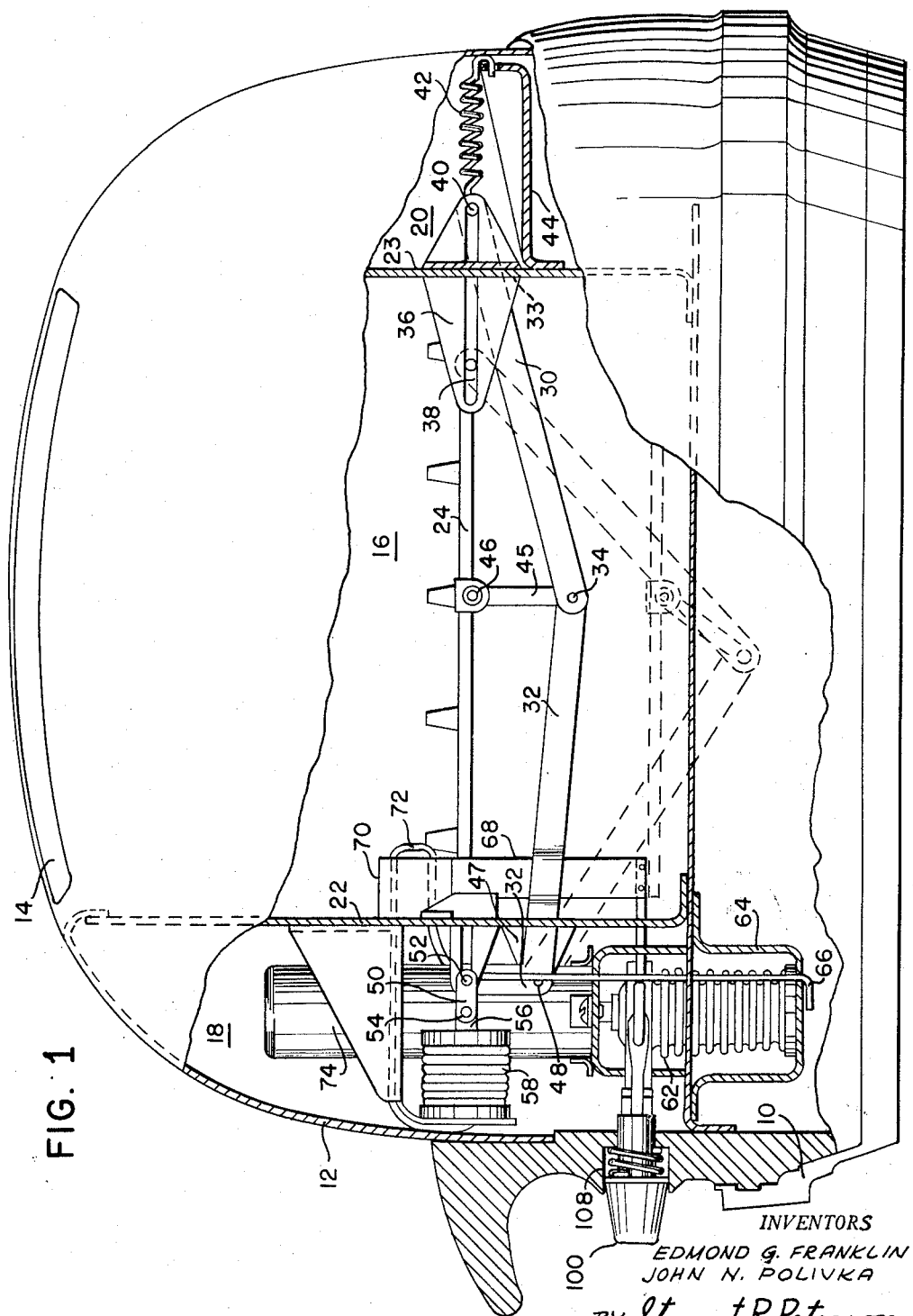
Figure 1 is a side elevational view of a toaster embodying this invention with parts broken away in order to show the internal construction thereof.
Figure 2:
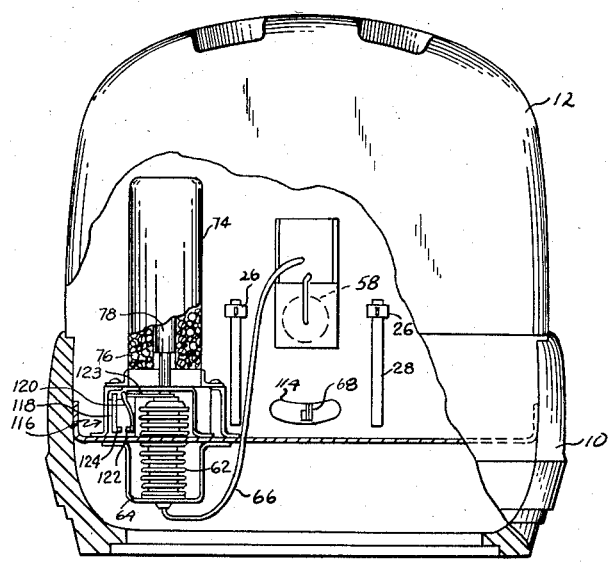
Figure 2 is an end view of the toaster, parts again being broken away in order to illustrate some of the internal construction that the toaster may assume.
Figure 3:
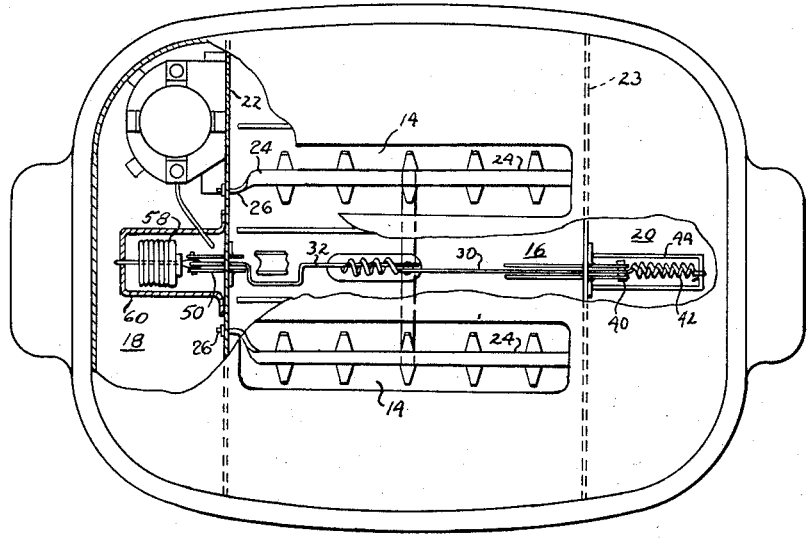
Figure 3 is a plan view with parts removed to show certain internal features of the invention.

Referring in detail to the drawings the toaster which has been selected for the purpose of exemplifying the invention comprises a plastic base 10 and a hood or casing 12 provided with conventional bread slots 14, the bread slots 14 providing access to a toasting compartment 16. In the compartment 16 are the usual spaced heating elements 17. Flanking each end of the toasting compartment 16 is a mechanism compartment 18 and a similarly configured compartment 20, these compartments being comparatively distinct from the toasting compartment by reason of partitions 22 and 23.

Within the toasting compartment 16 is a toast rack or carriage 24 (actually two of these members) for the purpose of lowering the bread into the toasting position and later raising the toast to an extent sufficient to permit its facile removal. The toast rack is guided in its vertical path by means of oppositely issuing lugs 26 which are tracked in slots 28 provided in each of the partitions 22 and 23.

For the purpose of raising the toast rack 24 there is provided a return link 30 which cooperates with a bell crank 32, the return link projecting through a slot 33 formed in the partition 23. The link 30 and the bell crank 32 are pivotally connected with each other by a pin 34. Inasmuch as a bracket 36 with a slot 38 is contemplated, it can be seen that by virtue of a pin 40, the right end of the return link 30, as viewed in Figure 1, is restrained so that it will traverse a substantially horizontal path. Since the purpose of the return link 30, as its name indicates, is to raise the rack 24 after a toasting operation, the instrumentality by which such action is achieved takes the form of a relatively strong elevating spring 42. One end of the spring 42 is attached to the pin 40 and the other is anchored to a bracket 44 having one end fixed, as by welding, to the partition 23. By so arranging the parts, it will be appreciated that the spring 42, through its action against the pin 40, is responsible for urging this pin to the right as pictured in solid outline in Figure 1. Aiding in the raising and lowering of the toast rack 24 is another link 45 having its lower end pivotally connected to the juncture of the return link 30 and the bell crank 32 by means of the pin 34. The upper end of the link 45 is pivotally connected to the underside of the toast rack by means of a pin 46.

Describing the bell crank 32 in greater detail, together with the mechanism associated therewith, it will be observed that a bracket 47, which may be anchored directly to the partition 22, serves to pivotally support the bell crank by means of a pin 48 extending through both the bracket and bell crank. At the upper end of the bell crank there is connected a pair of parallel links 50, these links being pivotally joined to the bell crank by a pin 52. Another pin 54 serves the office of connecting the other ends of the parallel links 50 to a lug 56.

The lug 56 is attached to a bellows 58 and expansion of the bellows results in the fulcruming of the bell crank 32 about its pivot point 48. One end of the bellows 58 is fixedly positioned by a U-shaped bracket 60 so as to absorb the reactive thrust. A second bellows 62, this bellows being shown vertically disposed, has one end anchored by virtue of a somewhat similar U-shaped bracket 64. Connecting the bellows 58 and 62 in fluid communication with each other is a tube 66.

For a purpose that will hereinafter be explained in greater detail, there is supplied a bimetallic element 68 having its upper end anchored at 70. A portion of the tube 66, designated specifically by the reference numeral 72, extends transversely in a U-shaped fashion along each side of the bimetallic element in the vicinity of its anchored end. By having the U-shaped section 72 contiguous with the bimetallic element, it will be appreciated that an excellent heat transfer relationship is established between the tube and the metal forming the bimetallic element. By so doing, fluid flowing in either direction through the tube 66 will be instrumental in removing residual heat from the bimetallic element. However, more will be said presently concerning the precise function of the tube with respect to the bimetallic element.

Since it is contemplated that the toaster which has been selected for the purpose of embodying the concepts of the instant invention be as effortlessly operated as possible, it is preferred that the bellows 62 be compressed by way of an electrically energized power means rather than manually compressed. With this in mind, there is provided a solenoid 74 including a coil 76 and an armature 78 coaxial therewith, the lower end of the armature 78 having engagement with the upper end of the bellows 62. Consequently, when the solenoid 74 is energized, the downward movement of the armature will exert sufficient force against the bellows 62 so that this particular bellows will be compressed and the fluid contained therein will flow under pressure to the bellows 58. In this way the force is transmitted to the linkage responsible for lowering the toast rack 24.

For the purpose of energizing the solenoid 74 in order to initiate a toasting operation, there is furnished a switch designated in its entirety by the reference numeral 80. This switch includes three arms 82, 84, and 86. The arm 82 carries at its free end a contact 88; the arm 84 carries on opposite sides a pair of contacts 90 and 92; whereas the third arm 86 is equipped with a similar contact 94. The first arm 82 is actuated by an L-shaped lever 96 pivotally mounted at 98. In order to actuate the lever, there is a push button 100 accessible from the exterior of the toaster, the push button being attached to the outer end of a stem 102 which stem is in turn connected at 104 to the L-shaped lever 96. Biasing the push button 100 outwardly is a spring 106 positioned in a counter bore 108 formed in the plastic base 10.

The third arm 86 is arranged so as to be actuated by a lateral finger or lug 110 riveted to the lower end of the bimetallic element 68. Since the lateral finger 110 is not intended to carry any current, it is preferably made of insulating material, and in order for it to engage the free end of the switch arm 86 there is formed an arcuate slot 114 in the partition 22. The role played by the bimetallic 68 and its lateral finger 110 will soon be made manifest. However, before describing in detail the operation of the system, it is important to note that a hold-in switch 116, including downwardly extending switch arms 118 and 120 each equipped with a contact 122 and 124, respectively, is utilized. Carried by the armature 78 of the solenoid is a laterally extending finger 123, this finger being arranged so as to engage the arm 120 in such a manner that the contact 122 and 124 will be closed when the armature has been attracted downwardly which downward position of the armature is responsible for initiating the toast operation.

Figure 4:
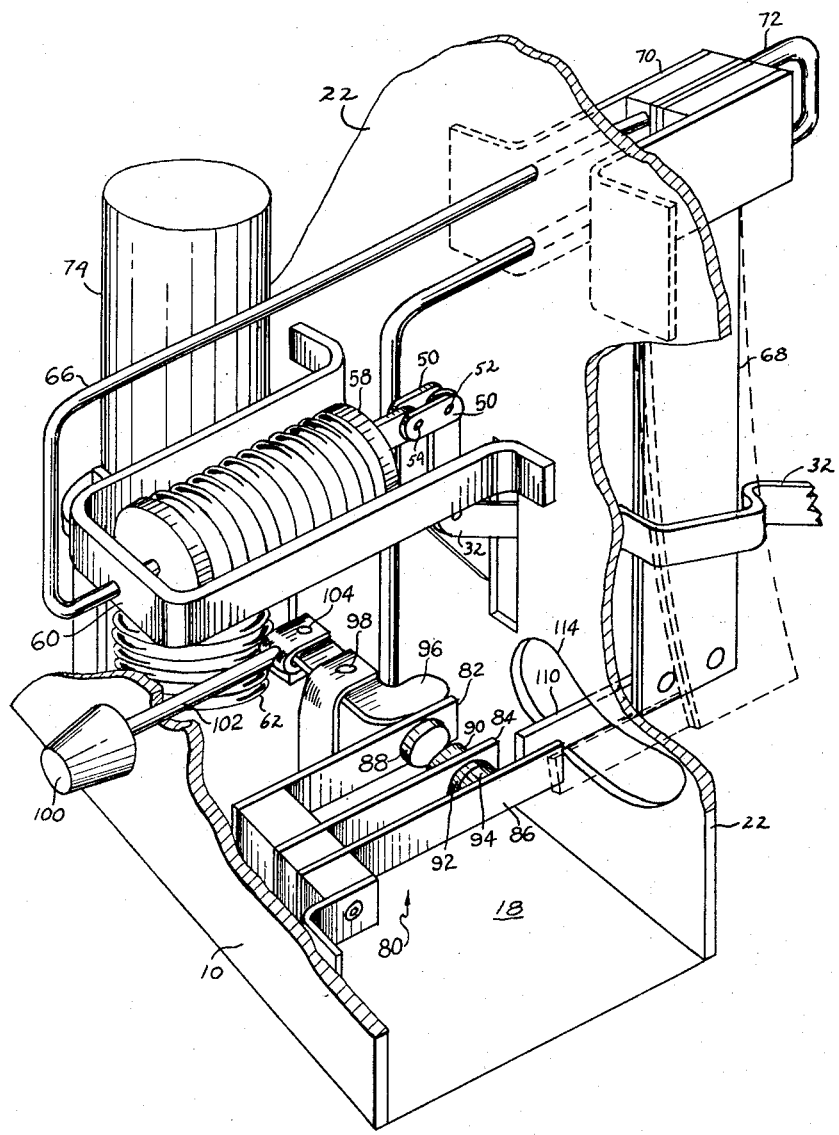
Figure 4 is a fragmentary perspective view illustrating the mechanism for lowering the bread into toasting position.

Solely for the purpose of simplifying the drawings as much as possible, mechanism for controlling the color or degree of toasting is not pictured. However, such a mechanism might take the form of a separately actuated knob that could be moved so as to modify the position of the switch arm 84. If the switch arm 84 were moved farther to the right as viewed in Figure 4, then, of course, the arm 86 likewise would have its position changed with the consequent result that this latter arm would be engaged at a later point in the deflective movement of the bimetallic element 68 and a darker or more pronounced toasting action would occur.

Figure 6:
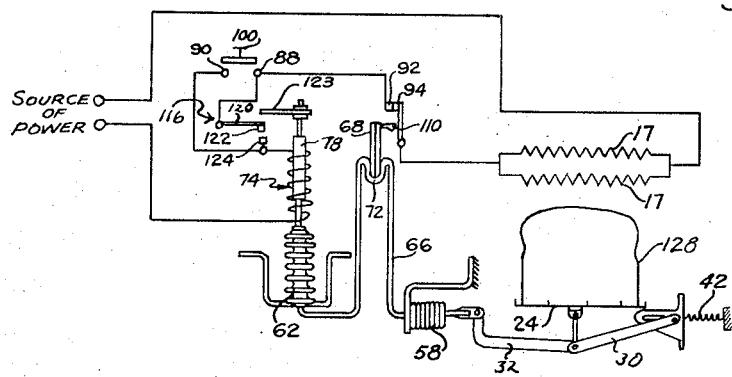
Figure 6 is a schematic diagram illustrating the basic structure that is employed in the system forming the subject matter of the instant invention.

In order to render the operation of the system as easily understandable as possible, it is suggested that attention now be directed to the schematic diagram constituting the subject matter of Figure 6. In this figure it will be observed that a slice of bread, labelled 128, has been placed upon the rack 24. After so doing the push button 100 is depressed which establishes a circuit from the source of power through the heating elements 17, the switch contacts 92 and 94 and the solenoid 74. With this circuit completed the heating elements 17 immediately begin to heat up and concomitantly therewith the energization of the solenoid 74 causes the bellows 62 to be compressed, inasmuch as such energization results in the armature 78 being moved downwardly. Since the hold-in switch 116 is in the path of the lateral finger 123, this switch will be closed as the armature 78 moves downwardly. Of course, the downward movement of the armature 78 takes place practically instantaneously and once the hold-in switch 116 has been closed, the actuating pressure from the push button 100 may be removed.

Figure 5:
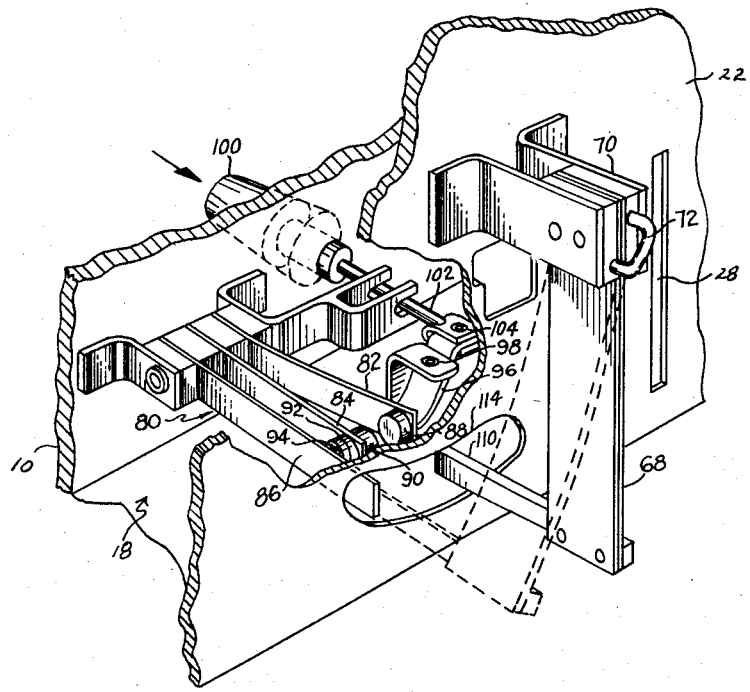
Figure 5 is another perspective view depicting some of the parts shown in Figure 4, the present view being in a different direction.

As the heating elements 17 continue to heat and toast the bread 128, heat is radiated to the bimetallic element 68 and this bimetallic element starts to warp. The warpage or deflection of the bimetallic element progresses from the solid line position shown in Figure 4 and Figure 5 until it ultimately contacts the switch arm 86 and moves to the dotted line position there shown. Having made engagement with the switch arm 86, the lateral finger 110 acts to separate the contacts 92 and 94. The separation of these contacts breaks the circuit above described which includes the heating elements 17, as well as the solenoid 74. The elevating spring 42 then serves as the means for raising the toast rack 24, and it is the action of the spring 42 that also helps, together with the inherent resiliency of the bellows itself, to return the bellows 58 to its original collapsed condition. Owing to the force applied to the bellows 58, the fluid contained therein is forced back into the bellows 62, in the course of its travel passing in heat receiving relationship with the bimetallic element 68.

As hereinbefore described, the tube 66 provided with the tube section 72 is in contact with the anchored end 70 of the bimetallic element. In this way the fluid flowing through the tube 66 withdraws heat from the bimetallic element and hence reduces the temperature thereof. The cooling of the bimetallic element is exceedingly desirable inasmuch as the return of this bimetallic element to its original temperature or approximately thereto will result in the bimetallic element having to warp or deflect more on the subsequent toasting operation than it would if all of the residual heat remained in this element. Not only does a cooling action take place during the transfer of fluid from the bellows 58 to the bellows 62 but when the second toasting operation is initiated, the flow of fluid from the bellows 62 back to the bellows 58, which is necessary to again lower the toast rack 24, the flow of fluid in this direction produces a still further cooling effect on the bimetallic element. Thus, it will be discerned that the bimetallic element undergoes a cooling action irrespective of the direction of fluid flowing through the tube 66. In this connection it is to be understood that the bellows 58 and 62 are disposed in the compartment 18 which is separated from the toasting compartment 16. Thus the bellows are located in a region that is normally at a cooler temperature with the result that the fluid stored in the system will be at an appreciably lower temperature than the bimetallic element 68 itself which is positioned within the toasting compartment 16. Also, it will be appreciated that the fluid, which preferably would be a liquid, has sufficient mass so that even though the compartment 18 might ultimately approach, though not reach the temperature of the toasting compartment, nonetheless, a marked cooling action will aways occur with respect to the bimetallic element 68 from the flow of fluid thereby before and after each toasting operation. In this way, the temperature of the element 68 will be much more stabilized than would otherwise be the case.

In conclusion, it should be pointed out that while a push button 100 has been pictured nonetheless, this push button with minor change could assume the form of a third operated switch position on the toast rack 24. When so modified, then the weight of the slice of bread 128 would initiate the toasting cycle.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

We claim:

1. A fluid system comprising pressure producing means, pressure responsive means, means movable by said pressure responsive means, passage means connecting said first two means with each other, temperature responsive means for sensing a temperature condition generally higher than that in the region of said respective pressure means, a portion of said temperature responsive means being in heat transfer relation with said passage means, means for producing said generally higher temperature condition, said last means being controlled by said temperature responsive means, and means providing a thermal barrier between said temperature responsive means and the two pressure means, whereby fluid flow through said passage means at a temperature different from that of the temperature responsive means will modify the temperature of said temperature means produced substantially by said temperature condition.

2. A fluid system comprising pump means, means responsive to fluid flow produced by said pump means, means actuatable by said second means, conduit means connecting said first two means with each other, temperature responsive means for sensing a temperature condition generally higher than that in the region of said pump means and said flow responsive means, a portion of said temperature responsive means being in contact with a portion of said conduit means and relatively thermally insulated from said pump means and said flow responsive means, and means for producing said generally higher temperature condition, said last means being controlled by said temperature responsive means whereby fluid flow through said conduit means at a temperature lower than that of the temperature responsive means produced primarily by said temperature condition will cool said temperature means.

3. A fluid system comprising two respective expandable and compressible means, a conduit connecting said two means with each other, means for compressing one of said two means to cause fluid flow to the other, means movable by the other means in response to fluid flow thereto, temperature responsive means for sensing a temperature condition generally higher than that in the region of said respective expandable and compressible means, a portion of said temperature means being in heat transfer relation with a portion of said conduit but relatively insulated from said expandable and compressible means, and means for producing said generally higher temperature condition, said last means being controlled by said temperature responsive means, whereby fluid flow through said conduit will modify the temperature of said temperature responsive means produced primarily by said temperature condition.

4. A fluid system comprising pressure producing means, pressure responsive means, means movable by said pressure responsive means, passage means connecting said first two means with each other, temperature responsive means including a bimetallic element responsive to a temperature condition generally higher than that in the region of said respective pressure means, said bimetallic element having an anchored end in contact with a portion of said passage means, means for producing said generally higher temperature condition, said last means being controlled by said temperature responsive means, and means providing a thermal barrier between said temperature resposnive means and the two pressure means, whereby fluid flow through said passage means at a temperature different from that of the bimetallic element will modify the temperature of said element produced substantially by said temperature condition.

5. A fluid system comprising first and second bellows, a conduit connecting said bellows with each other, means for applying a compressive force against the first bellows, means movable by the second bellows in response to fluid transmitted from said first bellows, and a bimetallic element responsive to a temperature condition generally higher than that in the region of said first and second bellows, said bimetallic element having one of its ends fixed, said fixed end being in contact with a portion of said conduit, means for producing said generally higher temperature condition, said last means being controlled by said temperature responsive means, and means providing a thermal barrier between said temperature responsive means and the two bellows, whereby fluid flow through said conduit at a temperature lower than that of the bimetallic element produced primarily by said temperature condition will cool said element.

6. A system in accordance with claim 5 including means biasing said second bellows into a compressed state to force fluid back to said first bellows when the compressive force applied to said first bellows is removed.

7. In an electrically heated device, pressure producing means, pressure responsive means, said respective pressure means being located in a relatively low temperature region, means movable by said pressure responsive means, conduit means connecting said two means with each other, an electrical heating unit, a pair of switch contacts in circuit with said heating unit and temperature responsive means for sensing a relatively high temperature condition produced by said heating unit and actuating said switch contacts at a given temperature, a portion of said temperature responsive means being in heat transfer relation with a portion of said conduit and in a relatively heat insulating relation with said two pressure means, whereby fluid flow through said passage means at a temperature below that of the temperature responsive means will cool said temperature means below that caused by said temperature condition.

8. In an electrically heated device, an electrical heating unit, a pair of switch contacts in circuit with said heating unit, pump means, means responsive to fluid flow produced by said pump means, said pump means and said responsive means being located in a relatively low temperature region, means actuatable by said second means for moving an object with respect to said heating unit, a conduit connecting said first two means with each other, a bimetallic element responsive to a relatively high temperature condition produced by said heating unit for actuating said contacts, a portion of said bimetallic element being in contact with a portion of said conduit and means providing a thermal barrier between said bimetallic element and the pump means and said flow responsive means, whereby fluid through said conduit at a temperature lower than that of the bimetallic element will cool said element.

9. In an electric toaster, an electrical heating unit, a pair of switch contacts in circuit with said heating unit, a bread rack movable with respect to said heating unit, pressure producing means, pressure responsive means for moving said bread rack in one direction relative said heating unit, said respective pressure means being located in a relatively low temperature region, means biasing said bread rack in an opposite direction when said pressure responsive means is ineffectual, a conduit connecting said first two means with each other, and temperature responsive means for sensing a relatively high temperature condition within the toaster so as to control said switch contacts and the energization of said heating unit, a portion of said temperature responsive means being in heat transfer relation with a portion of said conduit but in a relatively poor transfer relation with said two pressure means, whereby fluid flow through said conduit at a temperature lower than that of the temperature responsive means will cool said temperature means.

10. In an electric toaster, an electrical heating unit, switch means in circuit with said heating unit, a bread rack movable with respect to said heating unit, first and second bellows, a conduit connecting said bellows with each other, means for applying a compressive force against the first bellows, means engageable by said second bellows for moving said bread rack in one direction relative to said heating unit, means biasing said bread rack in an opposite direction when said means for applying a compressive force is rendered ineffectual, a bimetallic element for sensing a temperature condition within the toaster for actuating said switch means to control the energization of said heating unit, a portion of said bimetallic element being in heat conductive relation with a portion of said conduit, and means providing a thermal barrier between said bimetallic element and said two bellows, whereby fluid flow through said conduit in either direction at a temperature lower than that of the bimetallic element will cool said element.

11. In an electric toaster, an electrical heating unit, switch means in circuit with said heating unit, a bread rack movable with respect to said heating unit, first and second bellows, a conduit connecting said bellows with each other, means for applying a compressive force against the first bellows including a solenoid in circuit with said switch means, means engageable by said second bellows for moving said bread rack in one direction relative to said heating unit, means biasing said bread rack in an opposite direction when said means for applying a compressive force is rendered ineffectual, and a bimetallic element for sensing a temperature condition within the toaster engageable with said switch means for actuating said switch means to control the energization of said heating unit, a portion of said bimetallic element being in heat conductive relation with a portion of said conduit, whereby fluid flow through said conduit in either direction at a temperature lower than that of the bimetallic element will cool said element.

12. A toaster in accordance with claim 11 in which said switch means comprises three resilient contact arms, said bimetallic element being engageable with one arm to separate it from the middle arm, the toaster further including means for initiating a toasting operation which is engageable with the other arm.

References Cited in the file of this patent
UNITED STATES PATENTS

| | | |
|---|---|---|
| 1,329,350 | Heideman et al. | Jan. 27, 1920 |
| 1,736,984 | Sheats | Nov. 26, 1929 |
| 1,909,870 | Rosino | May 16, 1933 |
| 2,019,724 | Otto | Nov. 5, 1935 |
| 2,216,518 | Parsons | Oct. 1, 1940 |
| 2,266,301 | Biebel | Dec. 16, 1941 |
| 2,343,347 | Turner | Mar. 7, 1944 |
| 2,585,514 | Sutton | Feb. 12, 1952 |